United States Patent [19]
Joseph et al.

[11] 3,964,826
[45] June 22, 1976

[54] DUAL SOUND SYSTEM

[75] Inventors: John S. Joseph, Los Alamitos; Edwin B. Levinson, Tustin, both of Calif.

[73] Assignee: Sundstrand Data Control, Inc., Redmond, Wash.

[22] Filed: Nov. 30, 1973

[21] Appl. No.: 420,684

[52] U.S. Cl. .............................. 352/10; 352/133; 352/134; 352/27; 360/109
[51] Int. Cl.² ...................................... G03B 31/02
[58] Field of Search ............... 352/5, 8, 9, 10, 133, 352/134, 27; 179/100.3 E, 100.3 B, 100.3 L

[56] References Cited
UNITED STATES PATENTS

| | | | |
|---|---|---|---|
| 1,618,641 | 2/1927 | DeForest | 352/5 |
| 1,714,443 | 5/1929 | Pineschi | 179/100.3 E |
| 1,847,267 | 3/1932 | Scheibell | 179/100.3 B |
| 1,888,293 | 11/1932 | Schoenberg | 179/100.3 E |
| 1,925,919 | 9/1933 | Drew | 179/100.3 E |
| 1,942,066 | 1/1934 | Owens | 179/100.3 B |
| 1,958,996 | 5/1934 | Hansen | 179/100.3 E |
| 1,989,836 | 2/1935 | Whitman | 179/100.3 E |
| 2,432,123 | 12/1947 | Potter | 179/100.3 B |
| 2,443,004 | 6/1948 | Horwitz | 179/100.3 L |
| 2,901,940 | 9/1959 | Kuhnert | 352/160 |
| 3,508,816 | 4/1970 | Bottani | 352/10 X |

FOREIGN PATENTS OR APPLICATIONS

| | | | |
|---|---|---|---|
| 206,096 | 5/1955 | Australia | 352/10 |

*Primary Examiner*—Monroe H. Hayes
*Attorney, Agent, or Firm*—Wegner, Stellman, McCord, Wiles & Wood

[57] ABSTRACT

A Super-8 mm. movie film with two amplitude modulated optical sound tracks, one in each margin of the film. A method for optically recording and reproducing audio information with high fidelity on a very narrow sound track. A scanning apparatus has lens and masks which accurately define and direct a light beam on the film sound track for high fidelity reproduction.

6 Claims, 10 Drawing Figures

3,964,826

DUAL SOUND SYSTEM

This invention relates to a movie film with dual amplitude modulated optical sound tracks, methods for recording and reproducing audio information and to a scanning apparatus for reproducing the audio information.

BACKGROUND OF THE INVENTION

Movie films with dual sound tracks are often used, for example, in a bilingual production or to provide stereophonic sound. Dual sound tracks have not normally been available except on 16 mm. or 35 mm. film. There are situations where the smaller size and weight of an 8 mm. projector and film make it preferable. As an illustration, in-flight movies shown on commercial airlines commonly use 8 mm. equipment. However, many flights on which movies are shown are international, and often carry passengers who do not speak the same language. The ability to utilize bilingual sound tracks would enable more viewers to enjoy the film.

A standard 8 mm. movie film does not have a provision for a second optical sound track. The Super-8 film format, however, has an image location which leaves a margin along one edge that is used for a primary optical sound track. There is also a margin, although narrower, between the sprocket holes and the other film edge.

THE PRIOR ART

It has been proposed to utilize dual magnetic sound tracks with the Super-8 film, see Hafler U.S. Pat. No. 3,452,161. Film with magnetic sound track is more expensive to produce than that with an optical sound track, and the magnetic material on the face of the film adds to its thickness, increasing the size of the reels which are necessary. Lewin U.S. Pat. No. 2,950,971 shows a dual sound track film having an infrared optical track on one surface and a magnetic sound track on the other. Michelson U.S. Pat. Nos. 3,502,398, 3,502,399 and 3,502,404 illustrate multiple sound track configurations on 16 mm. or 35 mm. film.

THE INVENTION

The present invention provides for recording and reproducing a second optical sound track in the narrow margin between the sprocket holes and the film edge of the Super-8 film, with fidelity at least comparable to that afforded by the primary sound track in the larger margin. The use of the terms "primary" and "secondary" herein differentiates between the sound track in the usual location, the wide margin between the images and the film edge, and the sound track in the narrow margin between the sprocket openings and the other film edge which is made feasible by the present invention. The fidelity of the secondary sound track is not inferior to that of the primary sound track.

One feature of the invention is the provision of a super-8 mm. film with both primary and secondary amplitude modulated optical sound tracks thereon. More particularly, the primary sound track is in one margin and has a nominal dimension for 100 percent modulation of 0.020 inch. The secondary sound track is in the other margin of the film and has a nominal dimension for 100 percent modulation of 0.010 inch.

Another feature is the method of optically recording audio information on a film by directing a light beam on the film which has a beam dimension in the direction of movement of the film of the order of 0.2 of the wave length on the film of the maximum frequency to be recorded, and varying the other dimension of the light beam in accordance with the audio information.

A further feature is the method of reproducing sound so recorded on a motion picture film by establishing a light beam and directing it on the sound track of the film, having a fixed beam dimension in the direction of movement of the film of the order of one-half the wave length on the film of the highest recorded frequency to be reproduced.

Yet another feature is the provision of apparatus for establishing a scanning beam for the audio sound track and for focusing and aligning the beam with the sound track. More particularly, the light beam is projected on the film through a cylindrical lens which is movable axially of the light beam to focus it on the film surface and is rotational about the axis of the light beam to align the beam at right angles to the sound track.

Further features and advantages of the invention will be seen from the following specification and the drawings, in which.

Figure 1:
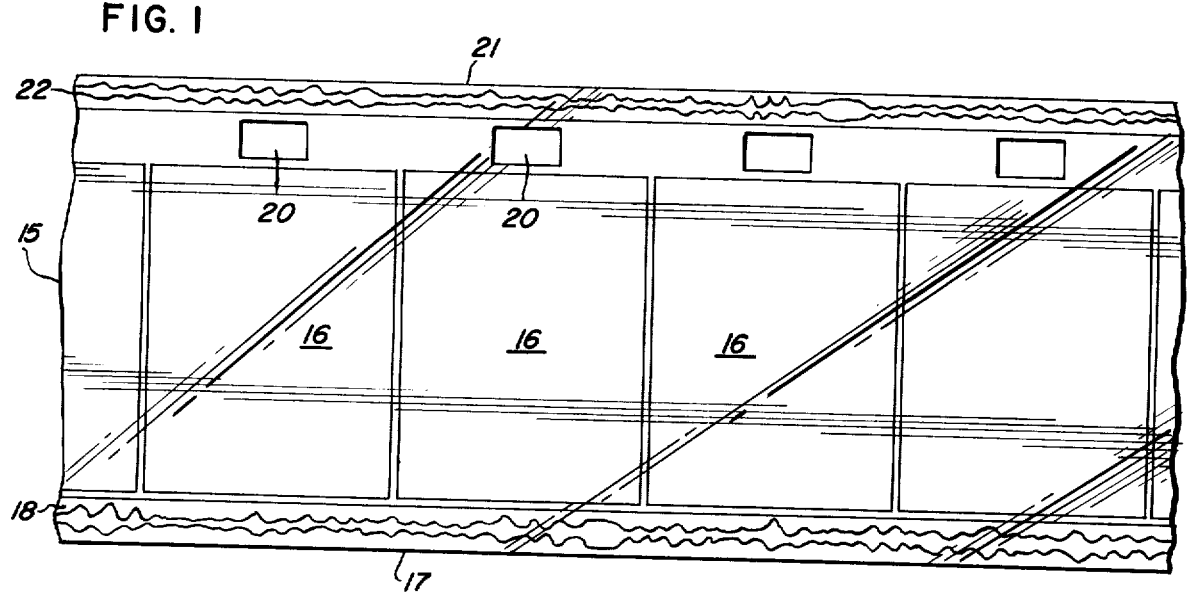
FIG. 1 is a view of the film showing the general format of the Super-8 mm. film with dual amplitude modulated optical sound tracks in accordance with the invention.

A section of the film 15 with the Super-8 mm. format is illustrated in FIG. 1. A series of images 16 occupy the center portion of the film. The images are spaced from the edge 17 leaving a margin for the primary sound track 18. As is common with amplitude modulated optical sound tracks, there is an opaque background and a transparent center portion, the width (amplitude) of which represents the audio information. Primary sound track 18 occupies a longitudinal band 0.030 inch wide and for 100 percent modulation has a transparent dimension of 0.020 inch.

Sprocket holes 20 are spaced from the film edge 21 leaving a margin of 0.020 inch in which the secondary sound track 22 is located. The nominal transparent dimension of sound track 22 for 100 percent modulation is 0.010 inch.

Figure 2:
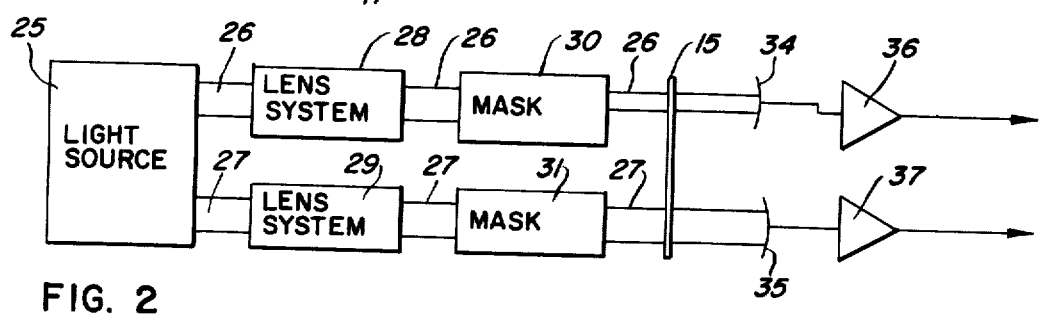
FIG. 2 is a block diagram of a dual channel sound reproducing system illustrating the invention.

A system for optically scanning the sound tracks and reproducing the audio information is illustrated in FIG. 2. A light source 25 generates two light beams 26 and 27 which are directed through lens systems 28 and 29 and masks 30, 31 to the sound track on film 15. The light beams 26 and 27 have a narrow dimension in the direction of movement of the film and a dimension transverse to the film which is no greater than the maximum width of the sound track so that it does not overlap the film edges, the images 16 or the sprocket holes 20. The beams are modulated by the audio information of the sound track and the modulated light is received by photocells 33, 34 which convert the varying intensity of the light beams to a correspondingly varying electrical signals. The signals are connected with amplifiers 36, 37 and the amplified outputs are connected with speakers or individual earphones. The two sound tracks may provide bilingual audio for the movie so that the viewer can select which language he wishes to utilize. Alternatively, the dual sound tracks may be used to provide stereophonic sound to accompany the film. The nature of the audio information recorded is not a part of the present invention.

The small size of the secondary sound track requires that the scanning means provide for precise control of the geometry of the light beam. This enables the development of a high fidelity audio signal with a minimum of noise and distortion.

The preferred form of the optical scanning apparatus for the two track film is illustrated in FIGS. 3–6. A lamp 40 is a source for light which is directed through an aperture 41 in a mask plate and an infrared filter 42 to two bores 43, 44 in a body 45 which carries the focusing lenses and further beam masks, as will appear. The mask plate aperture 41 adjacent lamp 40 has a length corresponding to the length of the filament of lamp 40. This keeps reflected light from the bores 43, 44 and prevents the development of secondary images of the sound track. The width of aperture 41 contributes to the establishment of the dimension of the light beams in the direction of the movement of the sound tracks 18, 22 and prevents the development of secondary images from reflected light. The infrared filter 42 removes the infrared light component which might penetrate the opaque portions of the sound track. The filtered light passes through a cylindrical lens 47 from side to side in a direction transverse to the axis of the cylinder. The lens focuses the light providing a sharply defined beam with its narrow dimension in the direction of movement of the sound track, FIG. 6.

Each lens 47 is mounted in a tubular carrier and the carriers are received in the bores 43, 44 of the body 45. The carriers may be adjusted in position both axially and rotationally to focus and align the light beams.

Photocells 34, 35 are located in housing 50 carried by an adjustably mounted bracket 51. The electrical signals are derived through cables 52, 53.

The lateral dimension of mask opening 41 and the focusing effect of the cylindrical lenses 47 establish the dimension of the scanning beams in a direction longitudinally of the sound tracks. Mask plate 55 has apertures 56, 57 which establish the dimension of the light beams 26, 27 transverse to the longitudinal extent of the sound tracks. A film guide 60 engages film edges 17, 21 to maintain the position of the film with respect to mask openings 56, 57 as the film passes the scanning head to avoid interference which would be caused by misalignment of the sound tracks and light beams.

Figure 3:
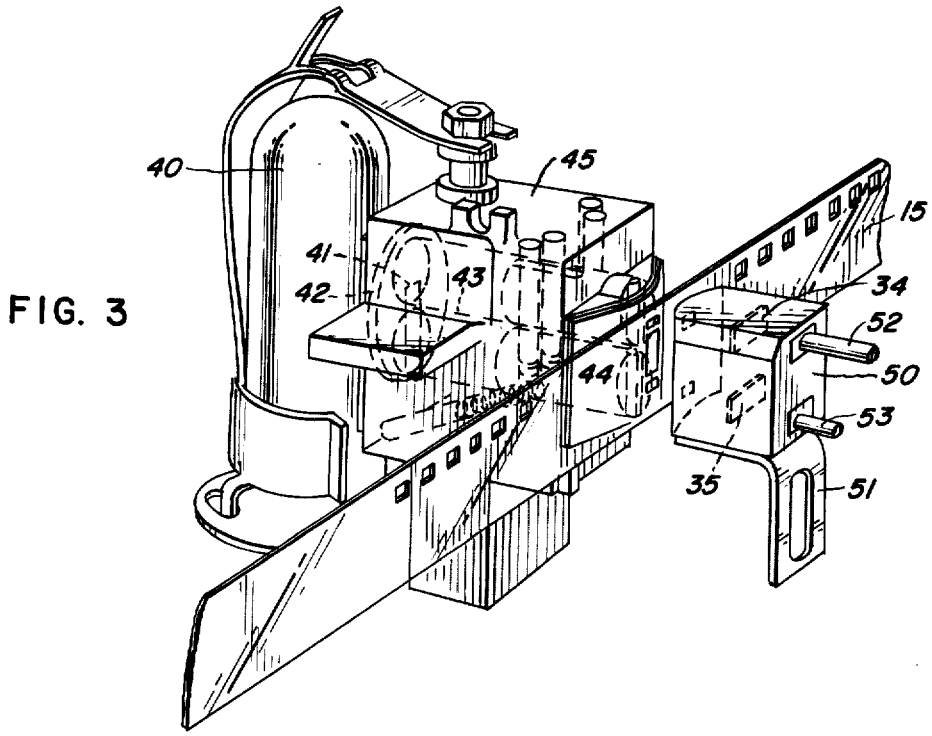
FIG. 3 is a perspective of the scanning apparatus of the invention.
Figure 4:
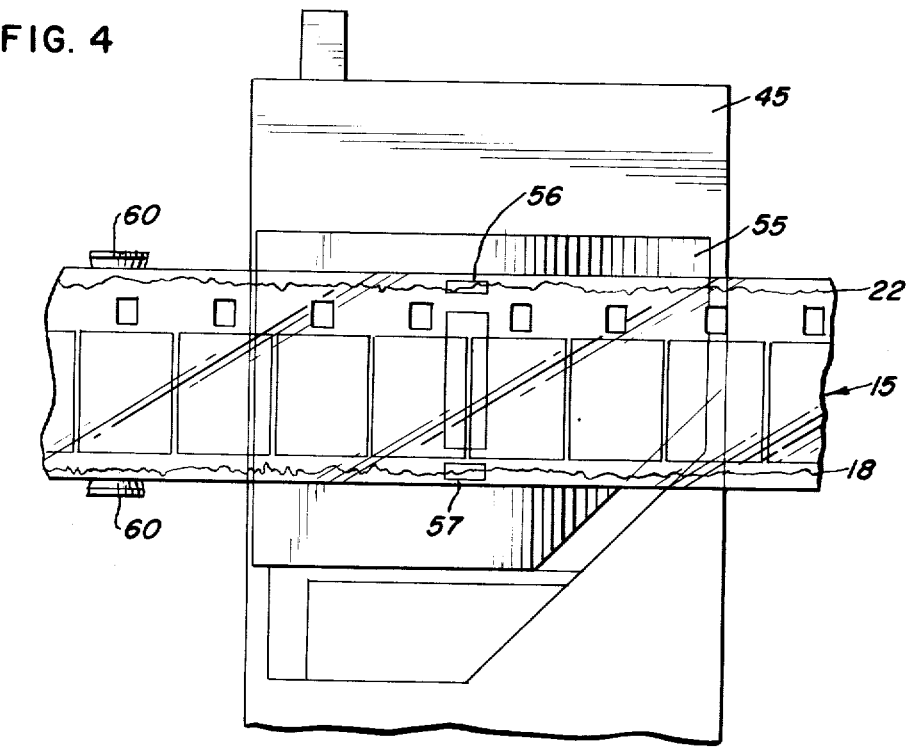
FIG. 4 is an elevation of the film and scanning head.
Figure 5:
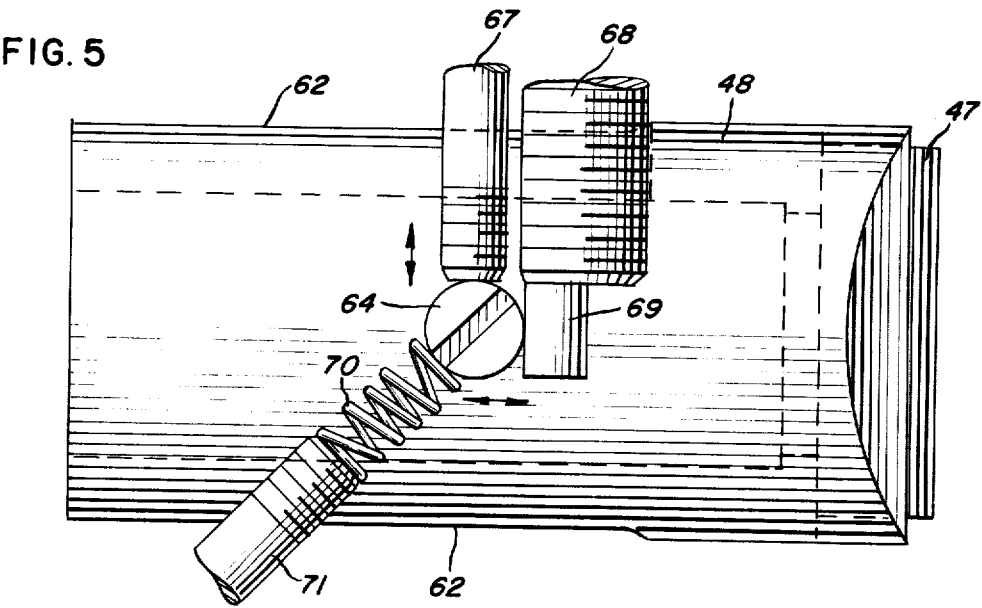
FIG. 5 is an enlarged fragmentary view of the lens carrier and adjusting means.
Figure 6:
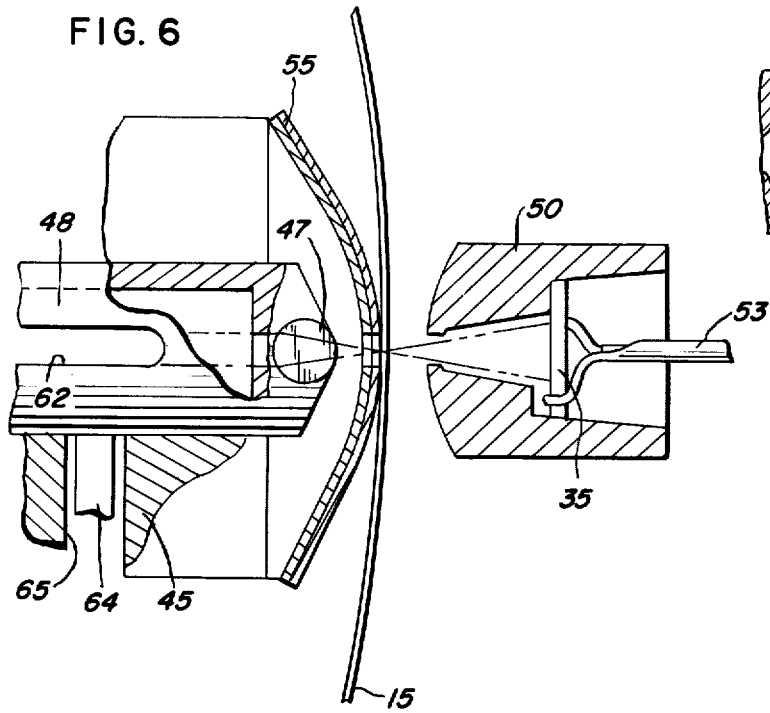
FIG. 6 is a fragmentary plan view of the lens, lens carrier, mask, film and photocells.

FIGS. 3, 5 and 6 illustrate the adjustment of the lens 47 to focus and align the light beam. Lens carrier 48 is a tubular metallic element received in the bore of body 43. The carrier has longitudinal cutouts 62 which allow the carrier to fit the bore. An actuating arm 64 is secured to the wall of the carrier and extends outwardly through a hole 65 in the body 45. Hole 65 has a dimension larger than that of arm 64 to accommodate limited movement of lens carrier 48. A first screw 67 threaded in the body 45 bears on the upper surface of the arm. A second screw 68 threaded in the body 45 has an eccentric extension 69 at its inner end which bears against the front surface of arm 64 to move the carrier axially of the bore of body 45 and thus axially of the light beam. A spring 70 held by a screw 71 bears against the surface of arm 64 urging it against screw 67 and extension 69 to hold the carrier 48 in position. Adjustment of screw 68 moves the lens carrier back and forth to focus the light beam while adjustment of screw 67 rotates the carrier to align the light beam at right angles to the sound track. FIGS. 5 and 6 illustrate the lens carrier for the primary sound track beam in bore 44. The lens carrier for the secondary sound track beam is a mirror image with the actuating arm extending in the opposite direction.

Adjustment of the screws to optimize the lens position is preferably done while scanning a test film and observing the output of the photocell on an oscilloscope. Both the focus and alignment of the light beam are adjusted for maximum output from the photocell.

Figure 7:
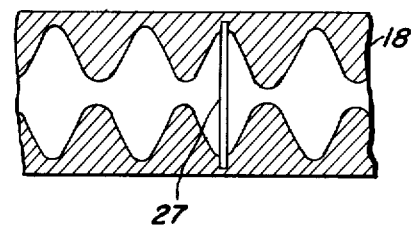
FIG. 7 is a diagram illustrating the scanning of the primary sound track.
Figure 8:
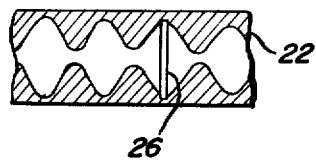
FIG. 8 is a diagram illustrating scanning of the secondary sound track.

Typical sound tracks and scanning beam dimensions are illustrated in FIGS. 7 and 8. The primary sound track 18 of FIG. 7 has a width of 0.030 with the peak-to-peak dimension of the audio information for 100 percent modulation being 0.020. The scanning beam 27 has a dimension of 0.024 inch laterally of the sound track, established by mask opening 57. The secondary sound track 22 has a width of 0.020 inch and a peak-to-peak dimension for 100 percent modulation of 0.010 inch. Light beam 26 has a lateral dimension of 0.012 inch determined by mask opening 56. In each case the narrow dimension of the light beam, in the direction of movement of the sound track is determined by the highest recorded frequency to be reproduced and the fidelity which is desired. In a typical system having a maximum audio frequency of 5000 Hertz and a film speed of 4 inches per second, the longitudinal beam dimension is one-half wave length or 0.0004 inch. The half-wave length beam dimension results in cancellation of second order harmonic distortion in the sound track.

Figure 9:
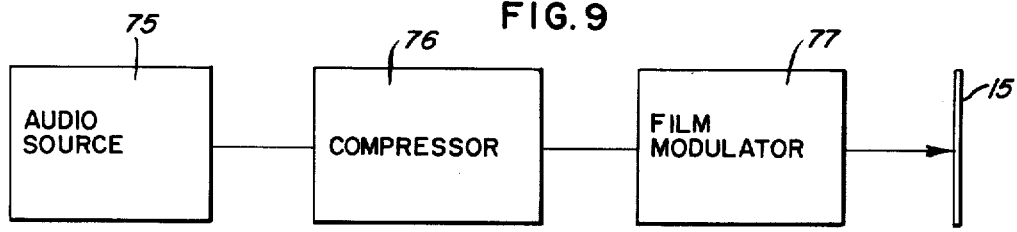
FIG. 9 is a block diagram of an apparatus for recording the audio information on the film.

A system for generating the audio sound track on film 15 is illustrated diagrammatically in FIG. 9. A signal from an audio source 75 is connected with a volume compressor 76, the output of which is connected to a film modulator 77. The film modulator generates a light beam which has a fixed dimension in the direction of the longitudinal movement of the film sound track and a variable dimension at right angles thereto or transverse to the movement of the sound track. The variable dimension is controlled in a suitable manner, as by a light valve or a galvanometer and mirror (not shown) to vary in accordance with the audio signal.

In order to achieve the desired fidelity, the fixed dimension of the recording light beam is preferably of the order of 0.2 of the wave length of the highest frequency to be recorded on the film. With a frequency of 5000 Hertz and a film speed of 4 inches per second, the fixed dimension of the light beam is 0.00016. This relationship optimizes recording of the fundamental and reduces the second harmonics which result from the aperture effect of optical recording.

Figure 10:
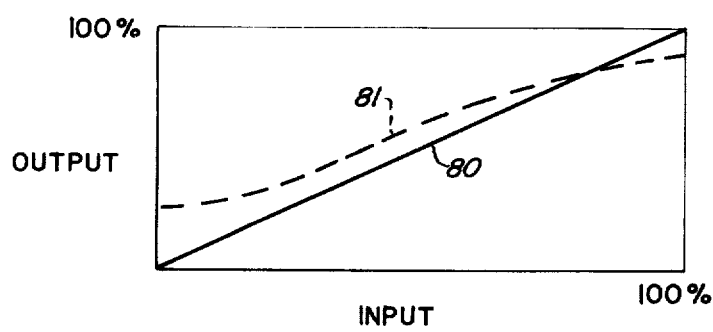
FIG. 10 is a curve illustrating volume compression of the audio signals to be recorded.

The volume compression of the audio signal prior to recording is particularly important because of the restricted dynamic range of the sound tracks, and particularly of the secondary sound track with its very narrow width. Volume compression amplifies the low level audio signals and reduces the high level signals. In FIG. 10, linear amplification, solid curve 80 is compared with volume compression, broken line curve 81, both plotted on a logarithmic scale. The primary sound track 18 may have a dynamic range of 20db while the secondary sound track 22 has a dynamic range of 14db.

We claim:

1. Scanning apparatus for longitudinally extending optical sound track on a movie film, comprising:
   a lamp;
   a body adjacent said lamp and having a bore therethrough to conduct a light beam from said lamp to said film;
   a mask to establish the light beam dimension longitudinally of said sound track;
   a lens carrier in said bore and movable longitudinally and rotationally thereof;
   a lens carried by said carrier;
   an actuating arm extending outwardly from said lens carrier through a hole in said body which is larger than the arm to accommodate a limited movement of the arm and carrier;
   first adjusting means engaging the arm to move the carrier axially of the bore, adjusting the focus of the light beam on said sound track;
   second adjusting means engaging the actuating arm at a point displaced from the engagement of the first adjusting means by 90° to rotate the carrier in said bore, orienting the light beam with respect to the sound track;
   a spring urging said arm into engagement with the first and second adjusting means; and
   means for receiving the light beam modulated by the optical sound track.

2. The scanning apparatus of claim 1 including a second mask between the body and the film to establish the dimension of said light beam at right angles to the longitudinal extent of the sound track.

3. The scanning apparatus of claim 1 wherein said first adjusting means is a screw threaded in said body having an eccentric end portion engaging the arm to move the carrier axially of the bore and the second adjusting means is a second screw, parallel to the first screw and having an end portion engaging said arm to rotate the carrier in the bore.

4. The scanning apparatus of claim 1 wherein the first adjusting means for moving the carrier axially is a first screw threaded in said body and the second adjusting means to rotate the carrier is a second screw threaded in said body.

5. The scanning apparatus of claim 1 for two spaced apart longitudinally extending optical sound tracks on a movie film, in which said body has two spaced apart parallel bores to conduct light beams from said lamp to the sound tracks of said film, with duplicate lens carriers and independent adjusting means for the light beams in each of said bores including two pairs of screws threaded in said body, the screws of one pair engaging one carrier to adjust it longitudinally and rotationally, and the screws of the other pair engaging the other carrier to adjust it longitudinally and rotationally.

6. The scanning apparatus of claim 5 in which the screws in each pair are parallel to enable access to all four screws for independent adjustment of the focus and alignment of both light beams, from the same side of the body.

* * * * *